(12) United States Patent
Benaloh et al.

(10) Patent No.: US 7,065,216 B1
(45) Date of Patent: Jun. 20, 2006

(54) METHODS AND SYSTEMS OF PROTECTING DIGITAL CONTENT

(75) Inventors: Josh D. Benaloh, Redmond, WA (US); Andrew D. Rosen, Woodinville, WA (US); Gideon A. Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 09/638,129

(22) Filed: Aug. 11, 2000

Related U.S. Application Data

(60) Provisional application No. 60/149,107, filed on Aug. 13, 1999.

(51) Int. Cl.
*H04L 9/00* (2006.01)

(52) U.S. Cl. .................. 380/282; 380/285; 726/26; 705/51

(58) Field of Classification Search ............... 705/57; 380/282; 713/176
See application file for complete search history.

(56) References Cited

U.S. PATENT DOCUMENTS

| | | | |
|---|---|---|---|
| 3,657,476 A | 4/1972 | Aiken | |
| 4,405,829 A | 9/1983 | Rivest et al. | |
| 4,864,615 A | 9/1989 | Bennett et al. | |
| 5,008,935 A * | 4/1991 | Roberts ............. | 380/29 |
| 5,201,000 A | 4/1993 | Matyas et al. | |
| 5,295,188 A | 3/1994 | Wilson et al. | |
| 5,319,705 A | 6/1994 | Halter et al. | |
| 5,438,622 A | 8/1995 | Normile et al. | |
| 5,481,610 A | 1/1996 | Doiron et al. | |
| 5,548,648 A | 8/1996 | York-Smith | |
| 5,615,264 A | 3/1997 | Kazmierczak et al. | |
| 5,675,649 A | 10/1997 | Brennan et al. | |
| 5,701,343 A | 12/1997 | Takashima et al. | |
| 5,708,714 A | 1/1998 | Lopez et al. | |
| 5,754,649 A * | 5/1998 | Ryan et al. ............. | 380/203 |
| 5,809,139 A * | 9/1998 | Girod et al. ............. | 380/202 |
| 5,870,474 A * | 2/1999 | Wasilewski et al. ........ | 380/211 |
| 5,915,018 A | 6/1999 | Aucsmith ............. | 380/4 |
| 5,915,027 A * | 6/1999 | Cox et al. ............. | 380/54 |
| 5,923,754 A * | 7/1999 | Angelo et al. ............. | 705/54 |
| 5,937,066 A | 8/1999 | Gennaro et al. | |
| RE36,310 E | 9/1999 | Bjerrum et al. | |
| 6,052,466 A | 4/2000 | Wright | |
| 6,182,216 B1 | 1/2001 | Luyster | |
| 6,195,751 B1 | 2/2001 | Caronni et al. | |
| 6,226,618 B1 * | 5/2001 | Downs et al. ............. | 705/1 |
| 6,259,789 B1 * | 7/2001 | Paone ............. | 380/28 |
| 6,347,145 B1 * | 2/2002 | Kato et al. ............. | 380/284 |
| 6,424,717 B1 * | 7/2002 | Pinder et al. ............. | 380/239 |
| 6,550,008 B1 | 4/2003 | Zhang et al. | |
| 6,556,679 B1 | 4/2003 | Kato et al. | |
| 6,598,161 B1 | 7/2003 | Kluttz et al. | |
| 6,697,488 B1 | 2/2004 | Cramer et al. | |
| 2002/0007454 A1 | 1/2002 | Tarpenning | |
| 2005/0065890 A1 * | 3/2005 | Benaloh ............. | 705/51 |
| 2005/0273629 A1 * | 12/2005 | Abrams et al. ............. | 713/189 |

FOREIGN PATENT DOCUMENTS

EP 0 978 839 A1 2/2000

(Continued)

*Primary Examiner*—Christopher Revak
(74) *Attorney, Agent, or Firm*—Lee & Hayes, PLLC

(57) ABSTRACT

Methods and systems are described that enable protection of digital content, such as movies and the like, by making pirated copies traceable back to a unique decryption key that was utilized to decrypt the originally encrypted content. Various embodiments can intrinsically link any unauthorized copies back to a unique cryptographic key or key collection that was used when the genuine copy was reproduced.

20 Claims, 13 Drawing Sheets

FOREIGN PATENT DOCUMENTS

| WO | WO 99/12310 | 3/1999 |
| WO | WO 00/21239 | 4/2000 |
| WO | WO 00/31744 | 6/2000 |
| WO | WO 01/13571 | 2/2001 |

* cited by examiner

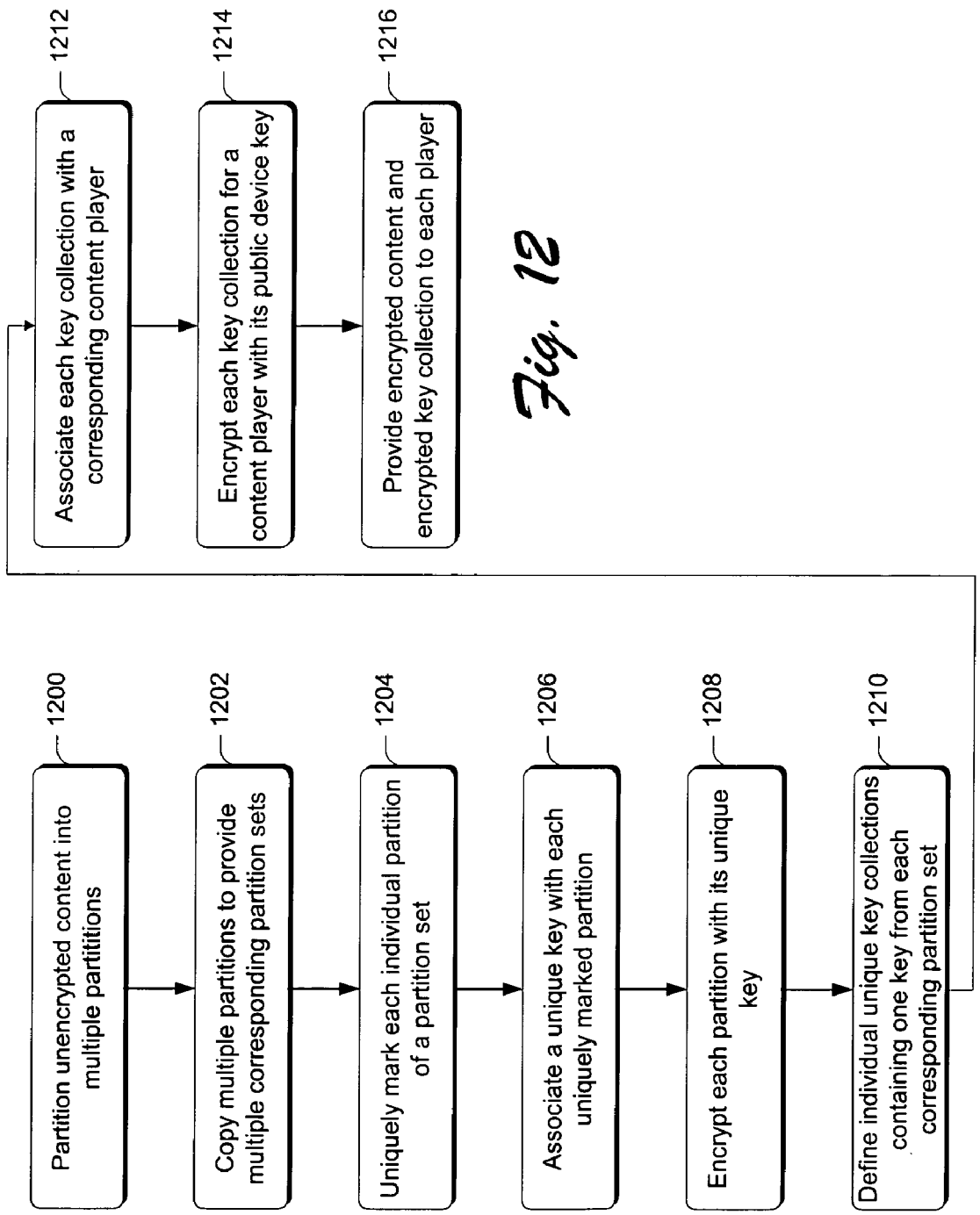

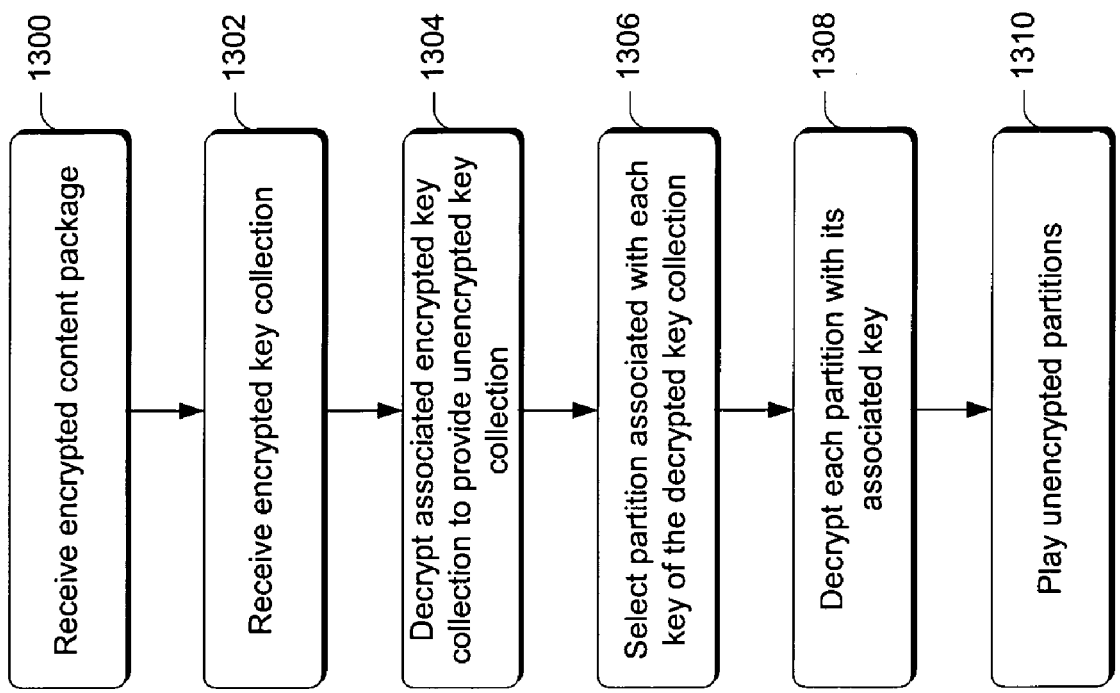

METHODS AND SYSTEMS OF PROTECTING DIGITAL CONTENT

RELATED APPLICATIONS

This application stems from and claims priority to U.S. Provisional Application Ser. No. 60/149,107, filed on Aug. 13, 1999, the disclosure of which is incorporated by reference herein.

TECHNICAL FIELD

This invention relates to methods and systems of protecting digital content.

BACKGROUND

Piracy of digital content continues to be a problem in today's computing and entertainment environments. Piracy occurs when a content user, whether authorized or not, makes an unauthorized copy of some type of digital content and distributes that content to others who are not authorized recipients of such content. While acts of piracy committed by unorganized individuals are problematic, organized acts of piracy, termed commercial piracy, are even more problematic. It is estimated by some that piracy, both individual and commercial, costs owners of digital content and others more than $2,000,000,000 per year. Acts of piracy can effectively touch every type of digital content for which there is a commercial market.

One way that has emerged to protect digital content is to digitally fingerprint or watermark the content in some way that is generally imperceptible to the user when the content is used in its normally intended manner, yet provides some type of information as to the origin or owner of the content. Fingerprinting or watermarking techniques typically involve adding or manipulating the bits of the digital content in a clever way. Yet, it seems, as sophisticated as such techniques can be, some digital pirates will stop at nothing to break a technique.

One thing has become clear—if owners of digital content are to continue to commercially exploit their content, new and innovative ways are going to need to be developed to stay one step ahead of the digital pirates. These new techniques are going to need to be streamlined and efficient so as to be employed in a convenient manner, as well as solid so as to avoid breaking under the efforts of pirates.

Accordingly, this invention arose out of concerns associated with providing improved methods and systems for protecting digital content.

SUMMARY

Methods and systems are described that enable protection of digital content, such as movies and the like, by making pirated copies traceable back to a unique decryption key or collection of keys that was utilized to decrypt the originally encrypted content. The innovative advancements do not rely on post-distribution watermarking or fingerprinting techniques, and yet intrinsically link any unauthorized copies back to a unique cryptographic key or key collection that was used when the genuine copy was reproduced.

In one embodiment, digital content is provided and comprises multiple partition sets, with each partition set comprising a first partition and at least one different version of the first partition. The different version of the partition can comprise a copy of the partition. The entire digital content, or less than the entire digital content can be partitioned. Each partition of each partition set is uniquely marked and encrypted with a different key. The unique marking on each partition can comprise any type of digital fingerprint or watermark. Individual unique key collections are then defined to contain, for each partition set, one key that was used to encrypt a partition from the partition set. Desirably, no two key collections are identical. This means that each key collection can decrypt one unique version of the digital content. This unique version of the digital content is inextricably tied, by virtue of the collection of partition fingerprints or watermarks on the partitions, to the key collection that was utilized to encrypt/decrypt the content. Each key collection is then encrypted with a different public key of a public/private key pair associated with one of multiple content players on which the digital content is to be played. Thus, each content player is inextricably associated with one key collection, and each key collection is inextricably associated with a unique version of the digital content. The digital content and one or more key collections can then be provided to the content players. When a content player decrypts its associated key collection with its private key, and uses the key collection to decrypt the digital content, the version of the digital content that is decrypted effectively points directly to the specific content player that was authorized to decrypt it with that particular key collection.

In one implementation, and one that is particularly well-suited for application with in-flight entertainment systems where a limited number of content players are provided both the encrypted digital content and the encrypted key collections for all of the content players can be provided on a common medium, such as a DVD. Each individual content player is only able to decrypt its associated key collection using a private key that is associated with the content player's public key that was used to encrypt the key collection. If the digital content is somehow pirated, then any additional copies of the digital content will indicate, by virtue of the unique marking on the content, the specific content player from which it came.

BRIEF DESCRIPTION OF THE DRAWINGS

FIG. 12 is a flow diagram that describes steps in a method in accordance with the described embodiments.

FIG. 13 is a flow diagram that describes steps in a method in accordance with the described embodiments.

DETAILED DESCRIPTION

The following description sets forth specific embodiments that incorporate elements recited in the appended claims. The embodiments are described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Exemplary Operating Environment

The inventive principles described below can be employed in connection with any suitable digital content player. One exemplary digital content player is a DVD player that is utilized in an example throughout this document. It is to be understood, however, that the illustrated DVD player constitutes but one exemplary type of digital content player with which the inventive principles can be employed. Other types of content players and, more particularly, DVD players can be utilized without departing from the spirit and scope of the claimed subject matter. Other types of content players include CD players, audio tape players, VCRs, set-top boxes, solid-state personal music players, video disc recorders, and software content players such as the Windows Media Player.

Figure 1:
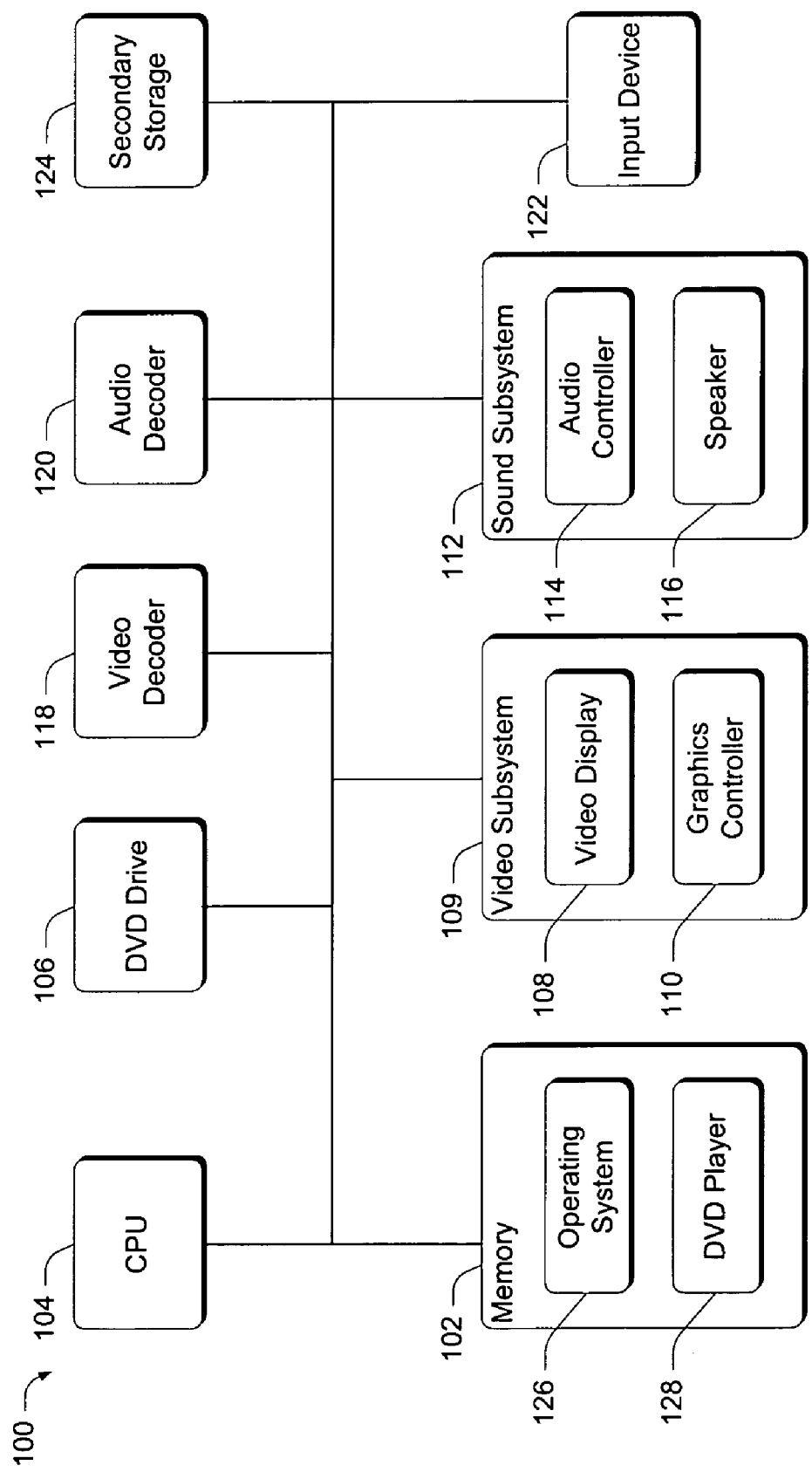
FIG. 1 is a block diagram of an exemplary content player that is suitable for use in connection with the described embodiments.

FIG. 1 depicts an exemplary DVD content player 100 that is suitable for practicing the described embodiments. The content player 100 contains a memory 102; a central processing unit (CPU) 104; a video subsystem 109, including a video display 108 and a graphics controller 110; a sound subsystem 112, including both an audio controller 114 and a speaker 116; a DVD drive 106; a video decoder 118; an audio decoder 120; an input device 122; and a secondary storage device 124. The memory 102 contains an operating system 126, such as the MICROSOFT® WINDOWS® 95 operating system available from Microsoft Corporation of Redmond, Wash., and a DVD player program 128. The DVD player program 128 is responsible for reading an audio-visual stream from the DVD drive 106, decoding the audio-visual stream using the audio decoder 120 and the video decoder 118, and rendering both the audio and video portions of the audio-visual stream on the sound subsystem 112 and the video display 108, respectively, such that the video portion of the audio-visual stream is synchronized with the graphics controller 110.

The graphics controller 110 controls operations of the video display 108. The graphics controller 110 stores video data to be displayed on the video display 108 and instructs the video display to display the stored video data. In order to store the video data, the graphics controller 110 has a limited amount of dynamic random access memory that it uses.

Both the audio decoder 120 and the video decoder 118 can be implemented as hardware circuits using conventional techniques for decoding the audio or video data, like MPEG 1, MPEG 2, or AC3. One skilled in the art will appreciate that the audio decoder 120 and the video decoder 118 can also be implemented in software. One skilled in the art will recognize that the video decoder 118, although depicted separately from the graphics controller 110, can be implemented as part of the graphics controller.

As previously stated, the DVD player 128 reads the audio-visual stream from the DVD drive 106 and renders the audio-visual stream using the video subsystem 109 and the sound subsystem 112. The DVD player 128 operates as an application program running on the operating system 126, and utilizes the operating system to access the DVD drive 106. Specifically, the DVD player 128 reads the audiovisual stream by requesting the operating system 126 to open a file on the DVD drive 106 that contains the audio-visual stream and by reading the stream from the DVD drive using normal file system calls of the operating system.

Generally, the CPU 104 of system 100 is programmed by means of instructions stored at different times in the various computer-readable storage media of the system. Programs and operating systems can typically be distributed, for the illustrated system, on DVDs. From there, they are installed or loaded into the secondary memory or storage of the system. At execution, they are loaded at least partially into the system's primary electronic memory. The invention described herein includes these and other various types of computer-readable storage media when such media contain instructions or programs for implementing the steps described below in conjunction with a microprocessor or other data processor. The invention also includes the system itself when programmed according to the methods and techniques described below. For purposes of illustration, programs and other executable program components such as the operating system are illustrated herein as discrete blocks, although it is recognized that such programs and components reside at various times in different storage components of the computer, and are executed by the CPU of the system.

The additional specifics of the operation of a DVD content player are understood by those of skill in the art and are not explored in any additional detail here.

Exemplary Embodiment

Figure 2:
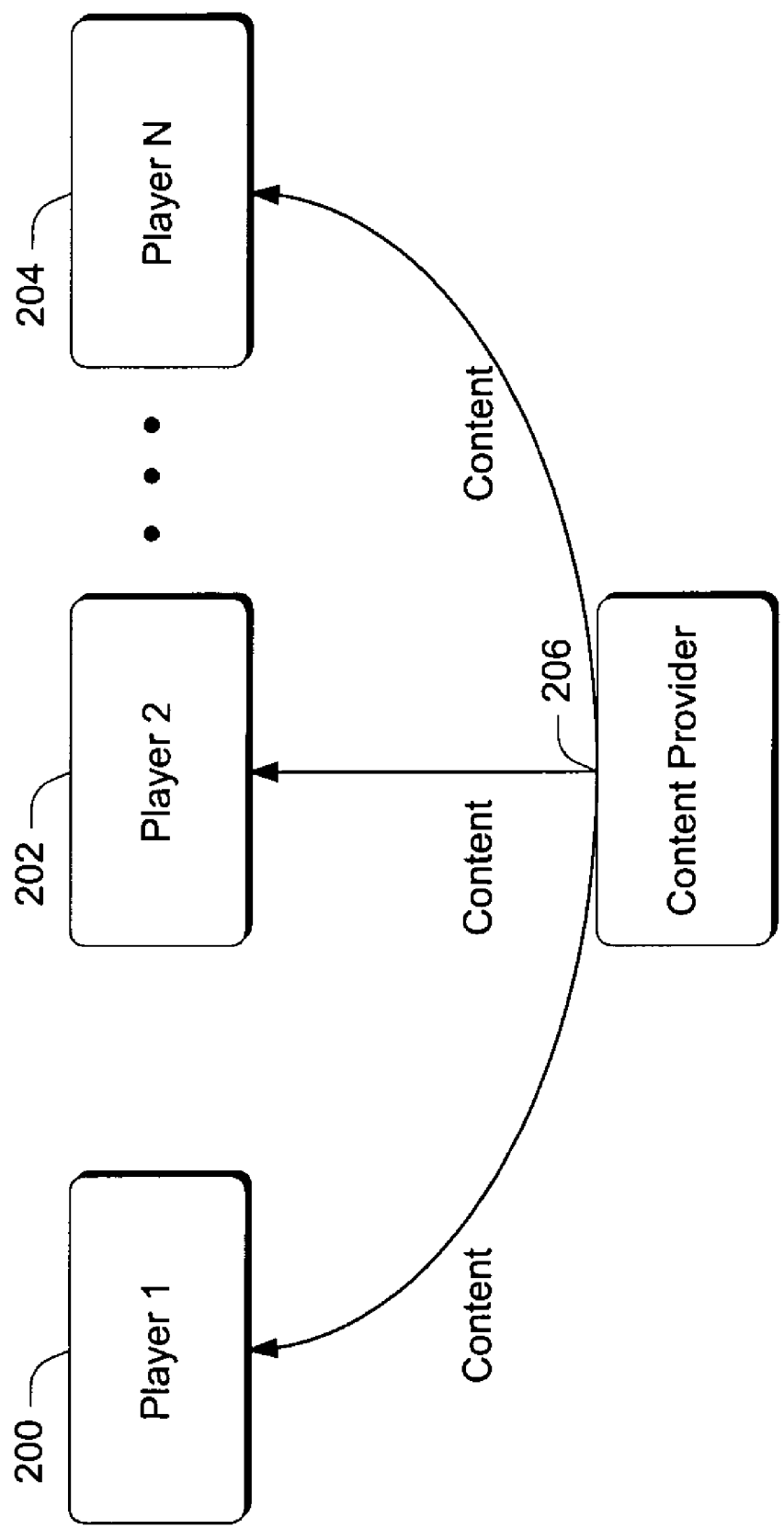
FIG. 2 is a high level block diagram of an exemplary operating environment in which the described embodiments can be practiced.

FIG. 2 illustrates but one exemplary environment in which the inventive techniques described below can be employed. It is to be appreciated that the illustrated and described environment is for exemplary purposes only, and to assist the reader in understanding, more tangibly, how the described inventive principles can be employed.

The FIG. 2 system comprises a system in which there are a limited or predetermined number of digital content players 200, 202, 204. In this example, the digital content players are labeled as "Player 1", "Player 2", and "Player N". As indicated above, the content players can comprise any suitable player that is capable of playing any type of digital content that is embodied on a readable medium. For purposes of this specific example, however, the content players can comprise DVD players, such as the one shown in FIG. 1, that are configured to play movies that are embodied on DVD discs. One exemplary environment in which such DVD players can be used—where there are a limited number of players—is the in-flight entertainment environment. Specifically, such content players are typically installed, semi-permanently, in commercial airliners so that airline passengers can enjoy in-flight movies. These in-flight movies are provided on DVD disks. Like other sources of digital content, these DVD disks can be subject to acts of commercial piracy. This is especially so because the DVD disks typically contain feature films that are still in limited release.

FIG. 2 also shows a content provider 206 that provides content to the content players. The content provider 206 can be any suitable content provider such as the owner of the digital content or a laboratory in charge of processing the digital content as described below. In the in-flight entertainment example, an exemplary content provider would be the owner or distributor (including a processing lab) of in-flight movies embodied on DVDs.

In designing systems for operation in an environment where digital content will likely come under attack, it is desirable to move in a direction away from specialized hardware solutions. That is, in the past, special tamper-resistant hardware has been used in an attempt to protect digital content. This hardware is typically installed in a player and is directed to ensuring that it protects its digital content. Specialized hardware solutions are not ideal because, among other reasons, they provide a motivation for hardware theft. Additionally, commercial pirates, being of a sophisticated nature, can generally design their own specialized hardware solutions that play back pirated content. Thus, if one is to move away from specialized hardware solutions, the natural direction is a software solution.

One past software solution which is less than ideal is to specially mark each digital content copy, i.e. movie, with its own unique identifier and to associate the marked copy with a particular airline or airplane. If or when a marked movie is copied, the identifier can be identified through analysis, and then easily traced back to the airline that "leaked" the movie. Currently, there is a push away from such serialization techniques because of the economics involved. Specifically, serially marking each copy of a movie is a tedious and undesirably expensive process. Yet, there remains a desire to preserve as much traceability and trackability as possible.

Thus, in the FIG. 2 system, the ideal system would be one in which each of the content players is identical in design, and devoid of specialized hardware. In addition, it would be ideal for the digital content that is distributed to each of the players to be identical. In this way, the economics of producing copies of the digital content are not adversely impacted.

One premise of the inventive design described below is that if a content player is a good or valid player, then any disc containing the digital content inserted into the player will play. If the disc containing the digital content is inserted into a bad or invalid player (such as a pirate's player), it will not play. Additionally, if the digital content on the disc is stolen, it should be traceable to the content player from which it came.

Thus, the inventive techniques discussed below provide an affirmative answer to the following question: Is it possible to take a single piece of encrypted content and have multiple different keys to decrypt the content such that, when the different keys are utilized to decrypt the content, the decrypted versions of the content will indicate which key, and hence, the content player from which it came?

Exemplary Content Player

Figure 3:
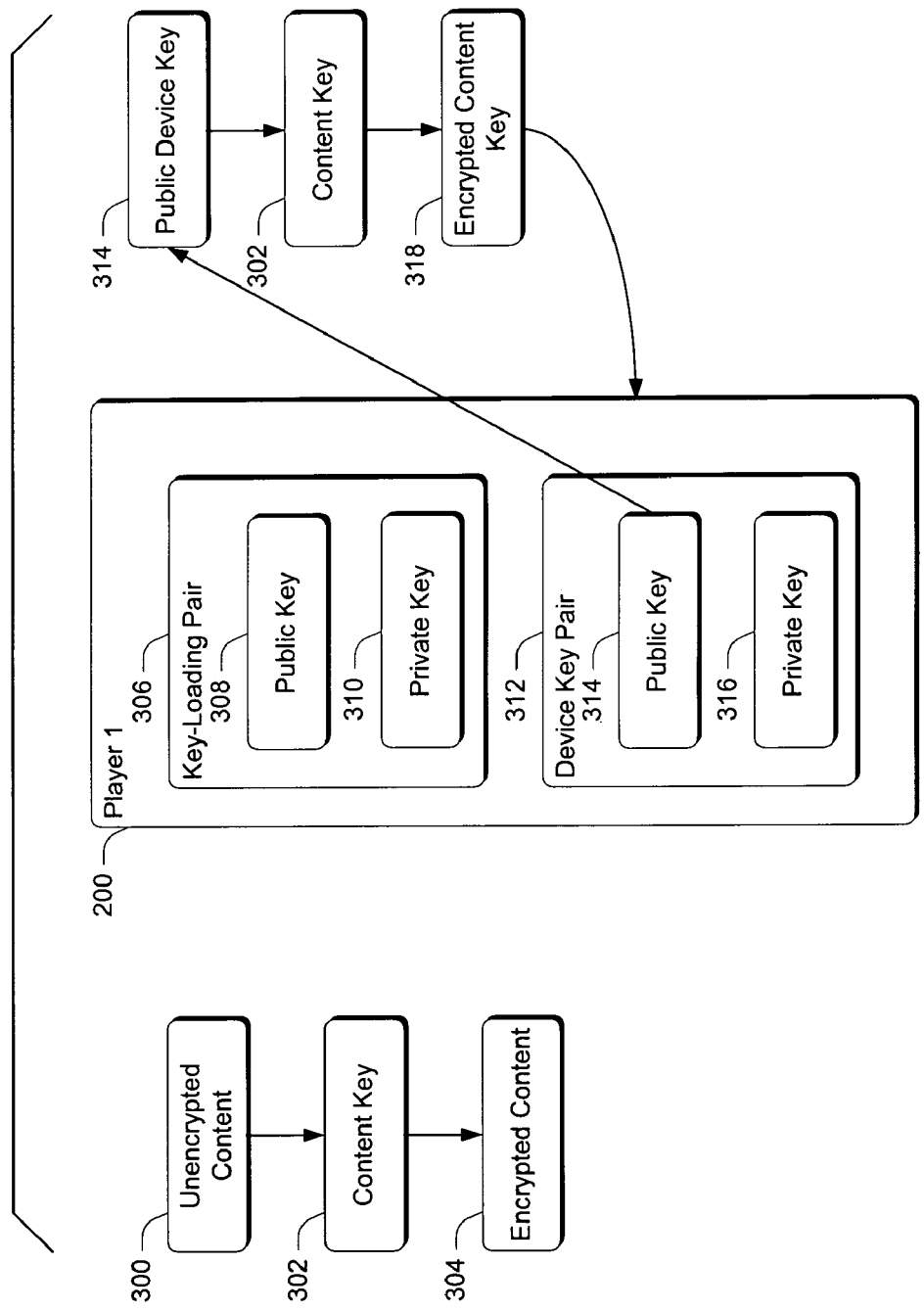
FIG. 3 is a block diagram showing an exemplary content player that can be utilized in connection with the described embodiments.

FIG. 3 shows content player 200 in somewhat more detail, along with other components that comprise an exemplary inventive system. Specifically, unencrypted content 300 is provided and constitutes any suitable type of digital content that is to be protected. In this particular example, content 300 comprises a movie that is to reside on a DVD and is to be used for in-flight entertainment. A content key 302 is provided and is used to encrypt all of the digital content on the DVD to provide encrypted content 304. The content key can be any suitable encryption key, as will be appreciated and understood by those of skill in the art. In the illustrated example, the content key is a symmetric cryptographic key. The encryption using the content key is typically carried out by the manufacturer of the DVD or a specialized laboratory.

Now, if player 200 possesses the content key 302 then it can use the content key to decrypt and play the encrypted movie. If player 200 does not possess the content key, then it cannot decrypt and play the movie.

The following discussion illustrates but one exemplary way of securely providing the content players with the encrypted content key 302. Other ways can, of course, be used without departing from the spirit and scope of the claimed subject matter.

In the illustrated and described embodiment, player 200 is provided with two pairs of public/private keys. A key-loading pair 306 includes a public key 308 and a private key 310. A device key pair 312 includes a public key 314 and a private key 316. It is possible, however, for the players to have only a device key pair, as will become apparent below.

Every content player is advantageously configured to generate its own unique key-loading pair 306. The player maintains and protects the key-loading private key 310 and provides the key-loading public key 308 to an entity whose responsibility it is to assign device key pairs. This entity might, for example, comprise the manufacturer of the content player. This entity maintains a list of content player serial numbers and their corresponding key-loading public keys. The manufacture also maintains a list of device key pairs that are to be used by the individual content players. The manufacturer uses the public key 308 of the key-loading pair 306 to encrypt the private key 316 of the device key pair 312. The encrypted private key 316 is then securely transferred to the content player. At this point, the content player can use the private key 310 of the key-loading pair 306 to decrypt the private key 316 of the device key pair 312. Note that the above discussion pertains to a system in which the device key pairs are externally generated by an entity such as a manufacturer. It is possible, however, for the players to generate their own device key pairs after they are manufactured and export their public device key to the manufacturer. This latter scenario would be the more secure of the two insofar as it reduces the possibility that a private device key might be compromised. Using a key-loading pair, however, makes it possible for subsequent device keys to be provided to the content player if, for example, the content player must be removed and serviced. In that case, the device keys for the content player would need to be erased to prevent compromise. Of course, it is possible for the content player to regenerate a new device key pair.

Accordingly, at this point, each content player has a device key pair, such as key pair 312, regardless of the way such pair came into being. The public device key 314 is then used, as indicated in the rightmost portion of the figure, to encrypt the content key 302 to provide an encrypted content key 318. The encrypted content key can then be provided to the player 200 and decrypted using the player's private device key 316. The player can now use the content key to decrypt the encrypted content 304.

Thus, the above discussion illustrates but one way of securely providing a content key to a content player so that the content player can use the content key to decrypt encrypted content. In the illustrated scenario of in-flight entertainment systems, the content players are essentially self-contained so that there are no additional communication lines into or out of the content player. With no additional communication lines, there must be some way of providing the encrypted content key to the player.

Figure 4:
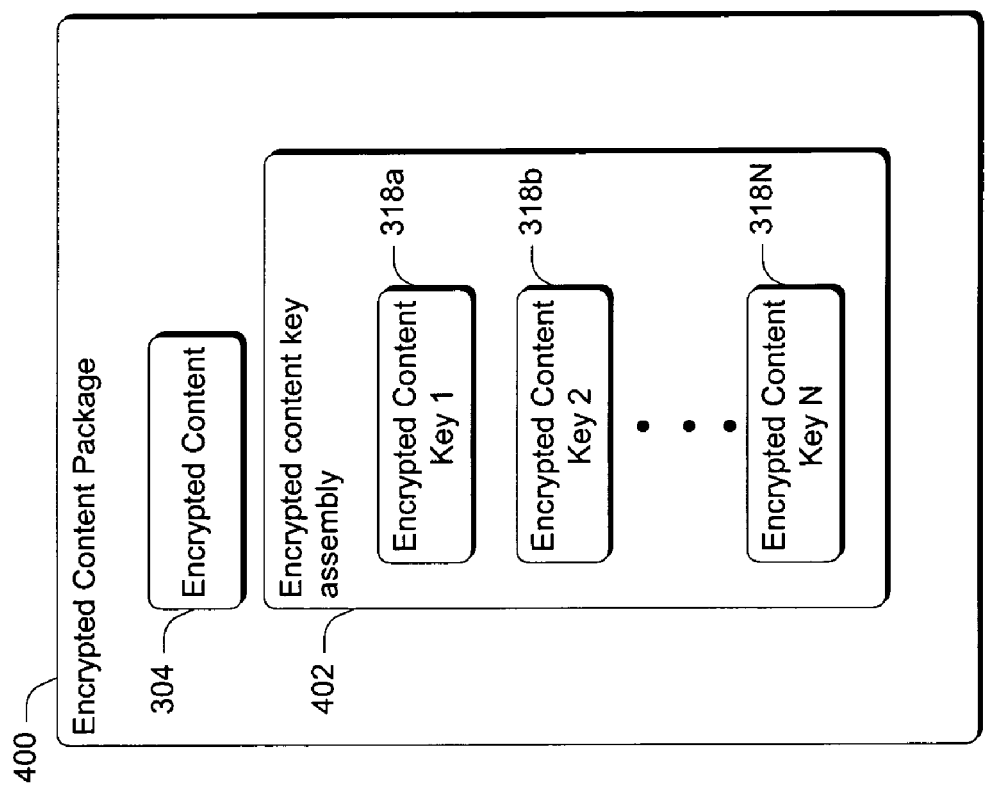
FIG. 4 is a block diagram that describes an exemplary encrypted content package that can be utilized in connection with the described embodiments.

FIG. 4 shows an exemplary solution to this situation in the form of an encrypted content package 400 which includes the encrypted content 304 (which, in this example, is the encrypted movie) and a so-called encrypted content key assembly 402. Both the encrypted content 304 and the encrypted content key assembly 402 are provided on the DVD. The encrypted content key assembly 402 contains multiple encrypted content keys 318a-N—one for each valid content player. So, in this example where there are 1 through N content players, the encrypted content key assembly contains an encrypted content key for each content player.

Figure 5:
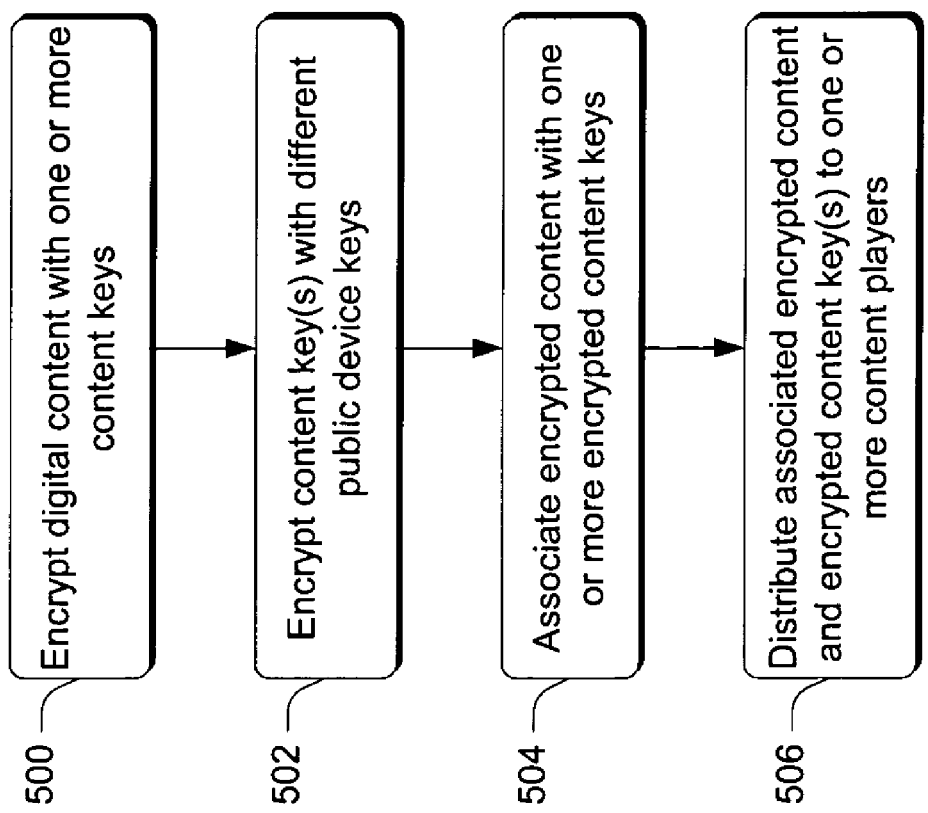
FIG. 5 is a flow diagram that describes steps in a method in accordance with the described embodiments.

FIG. 5 is a flow diagram that describes a method of associating encrypted content with a content key that was utilized to encrypt the content. Various steps of this method can be implemented in any suitable hardware, software, firmware or combination thereof. Step 500 encrypts digital content with one or more content keys. Any suitable content key(s) can be used. In an example that is given below, a content key actually comprises multiple different keys that are utilized to encrypt portions of the digital content. Step 502 encrypts the content key(s) with different public device keys. This provides multiple differently-encrypted content keys. Step 504 associates the encrypted digital content with one or more of the encrypted content keys. In the FIG. 4 example, this association is embodied in an encrypted content package 400. Step 506 distributes the associated encrypted content and encrypted content keys to one or more content players. In the above example, distribution takes place by embodying the encrypted content package 400 on a DVD and distributing the DVD to suitable content players.

Figure 6:
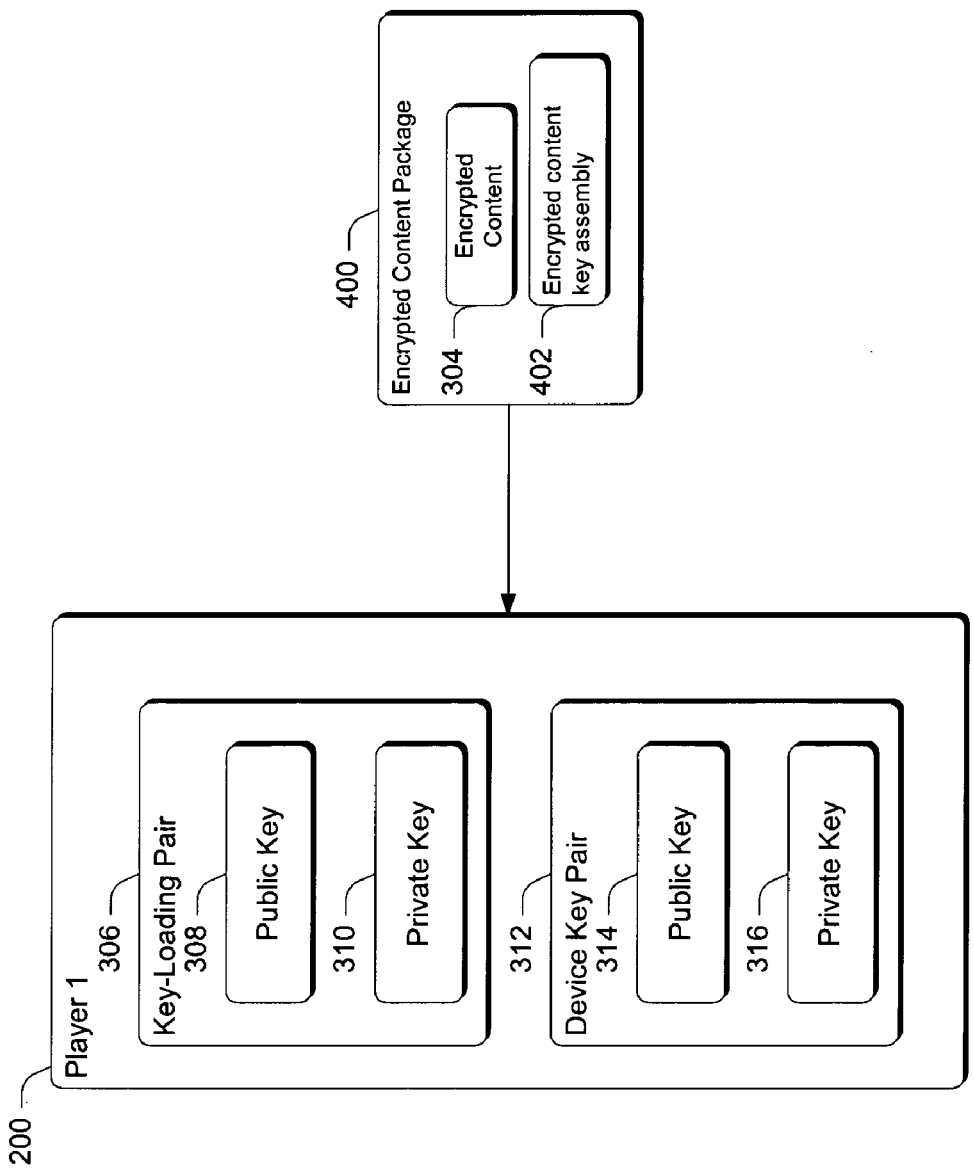
FIG. 6 is a block diagram that depicts the FIG. 3 content player and the FIG. 4 encrypted content package.

With the encrypted content package having been formed, it can now be provided to the various content players, as indicated by FIG. 6. In this example, the encrypted content package 400 is provided to a particular player by inserting a DVD embodying the encrypted content 304 and encrypted content key assembly 402 into the content player. The player is advantageously configured to find the content key(s) that have been encrypted with its public device key 314 (FIG. 3), decrypt the encrypted content key(s) using its private device key, and then decrypt the encrypted content 304 using the content key(s) so that the content or movie (in this example) can be displayed. Thus, only authorized content players are able to access the encrypted content key to decrypt the movie. Any unauthorized content player will not be able to decrypt the encrypted content because it will not have an associated private device key to decrypt associated encrypted content key(s).

Figure 7:
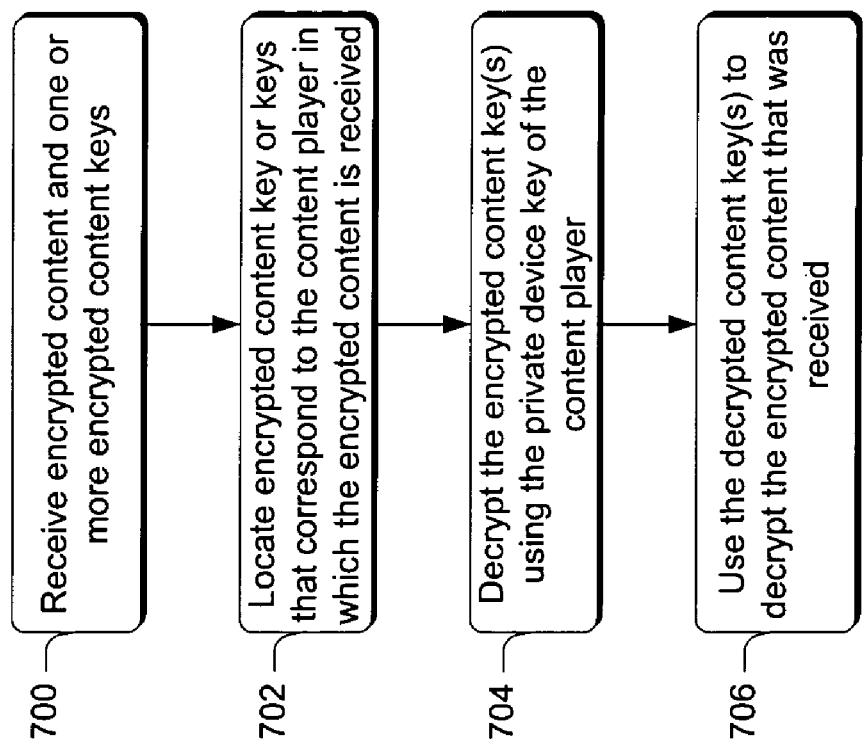
FIG. 7 is a flow diagram that describes steps in a method in accordance with the described embodiments.

FIG. 7 is a flow diagram that describes a method of accessing encrypted content. The method can be implemented in any suitable hardware, software, firmware or combination thereof. In the illustrated in-flight entertainment example, the method is implemented by a content player executing one or more software applications.

Step 700 receives encrypted content and one or more encrypted content keys. In the illustrated example, the encrypted content and content key(s) are embodied as an encrypted content package on a common medium in the form of a DVD. Advantageously, in this example, multiple differently-encrypted content keys are provided in the form of an encrypted content key assembly, such as assembly 402 in FIG. 400. The content keys are desirably encrypted using the public device key for each of the players to which the encrypted content is distributed, i.e. the "valid" content players. It is possible, however, for the encrypted content and the encrypted content key(s) to be separately received by a content player. For example, a content player might comprise a set-top box that first receives the encrypted content key(s), and then receives the encrypted content. Step 702 locates the encrypted content key(s) that correspond to the content player in which the encrypted content is received. Step 704 decrypts the encrypted content key(s) using the private device key of the content player. Step 706 then uses the decrypted content key to decrypt the encrypted content that was received. The decrypted content key(s) can then be used to decrypt the encrypted digital content.

This approach works especially well in environments where there are only a limited number of content players. The approach provides a secure, self-contained package that can only be opened by authorized content players. One of the problems with the above system, however, is that if the content is valuable enough, a pirate could conceivably steal or otherwise access a content player to get to the encrypted content package. The pirate could then conceivably access the encrypted content 304 in much the same way as the player would. Accordingly, what is needed and desirable is a system similar to the one described above, but in which any unauthorized copies of digital content are directly traceable to the particular content player, or more specifically, the particular content key(s) used to access the digital content.

Exemplary Differential Decryption System and Method

Digital fingerprinting is commonly desired to offer some protection for digital content. Traditionally, when intellectual property such as films, songs, or even software is illegally copied and resold, there is little if any ability to trace the source of the leak. Individually fingerprinting each legitimately distributed copy offers some measure of protection, but also presents a large burden. The approach about to be described drastically reduces this burden, regardless of the fingerprinting system used.

The embodiment about to be described carries with it some advantages of which the inventors are unaware in other protection schemes. First, even if a content player is stolen or otherwise compromised and the content decrypted with its associated content key(s), the decrypted content itself can inherently indicate the source of the content, i.e. the specific content player that was authorized to decrypt the content. Thus, if and when illegal copies are made, the source of the content is readily identifiable. Second, the overall system is dynamic in the sense that it is not dependent on any one fingerprinting or watermarking technology. That is, as fingerprinting technology continues to evolve, new techniques can be easily and seamlessly incorporated into the inventive systems, without any need to modify the content player's hardware.

In the discussion that follows, any suitable fingerprinting (or watermarking) method can be used. Such methods will be understood by those of skill in the art. Exemplary fingerprinting and/or watermarking techniques include, without limitation, the DivX RunningMark system, SDMI content protection, and Microsoft/Xerox ContentGuard.

Figure 8:
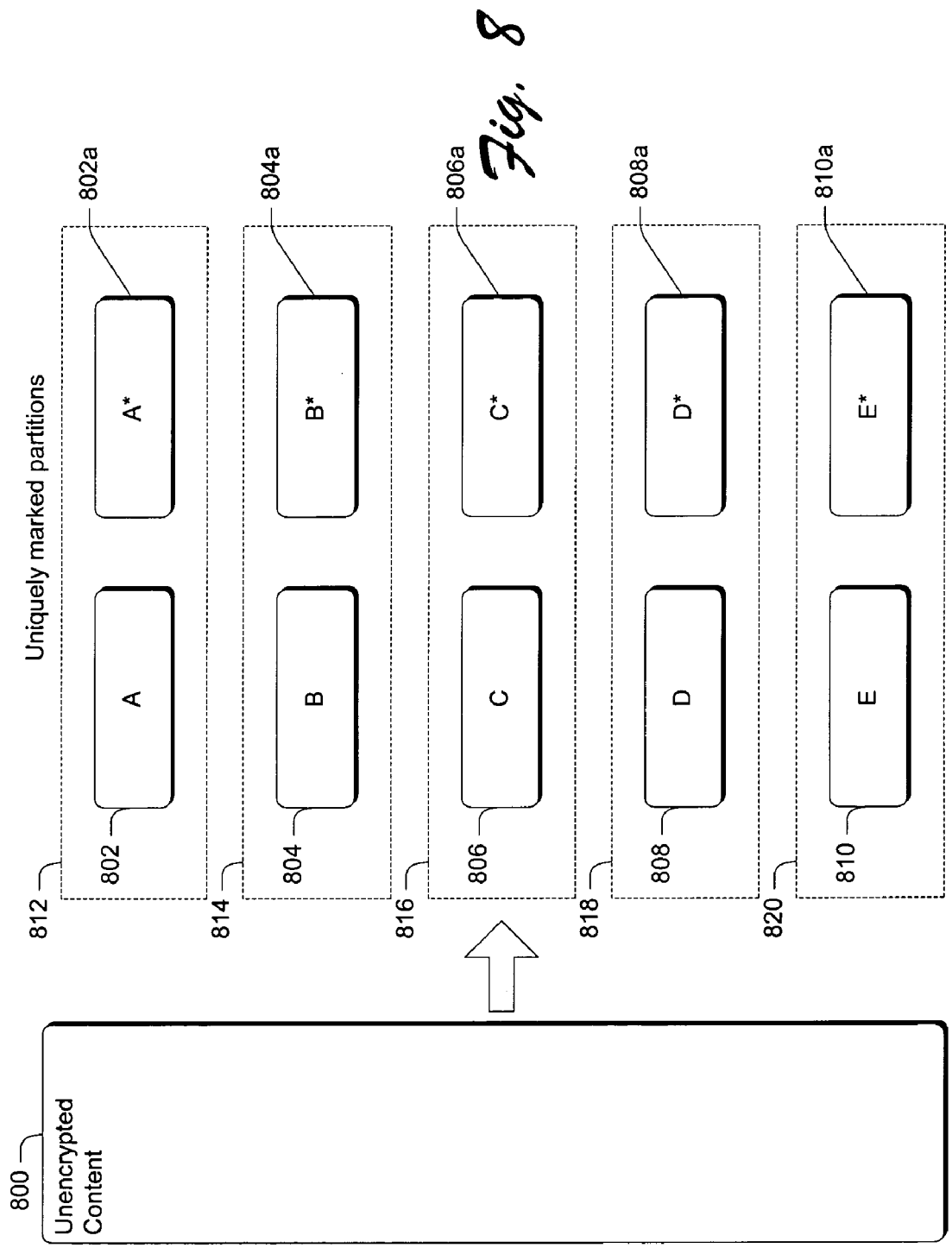
FIG. 8 is a block diagram that diagrammatically depicts exemplary processing steps in accordance with one described embodiment.

FIG. 8 shows unencrypted content 800 which can be any suitable unencrypted digital content. In the in-flight entertainment example, the unencrypted content may comprise a movie.

At this point, the unencrypted content has not been placed onto the medium that will ultimately carry it to the content player. All or part of the unencrypted content is first partitioned into multiple partitions. The partitioning of the content can take place over the entire content, or just a portion or selected portions. For example, an entire movie can be partitioned, or separate individual partitions can be defined within the body of the movie itself. In the movie embodiment, these partitions are also termed "clips". A clip or partition should be large enough to support a fingerprint or watermark therewithin. In the illustrated example, multiple partitions corresponding to the unencrypted content 800 are shown at 802, 804, 806, 808, and 810. In this example, these multiple partitions can comprise only a portion of the content. Once the partitions have been defined, one or more copies of each partition or clip is made to define multiple corresponding partition sets. Each of the individual partitions of a partition set is then separately and uniquely marked, as by any suitable fingerprinting or watermarking technique. For example, in the illustrated figure, partition 802 has a corresponding partition 802a. Partition 802 is designated as "A" and partition 802a is designated as "A*" to indicate that the partitions are corresponding partitions that have been separately and uniquely marked with a different fingerprint or watermark. Together the individual partitions 802, 802a define or mark up a partition set 812. The same can be said of the remaining partitions. That is, each partition 804, 806, 808, and 810 has a corresponding respective partition 804a, 806a, 808a, and 810a. These corresponding partitions define partition sets 814, 816, 818, and 820 respectively. Each of the partitions within a partition set is uniquely and separately marked with a different fingerprint or watermark. It will be appreciated that any portion of the partition or clip can be fingerprinted. For example, with a movie, the audio and/or video bit stream could have a fingerprint inserted therein. Flexibility is provided in that any known or subsequently developed fingerprinting or watermarking technique can be utilized.

As an aside, it will be appreciated that the definition and marking of the individual partitions need not take place in that order or as separate steps. Specifically, it is possible for the partitions to be inherently defined and marked in the very process that is used to create the unencrypted content. For example, with respect to a movie, several scenes of the movie might be filmed with two different cameras at slightly different angles. In this case, the movie scenes would comprise the partition or clip, and the angular difference as between the two filmed scenes would provide a mechanism by which the scenes are uniquely marked or fingerprinted.

After the partitions are defined and uniquely marked as described above, each partition of a partition set is encrypted with a different key.

Figure 9:
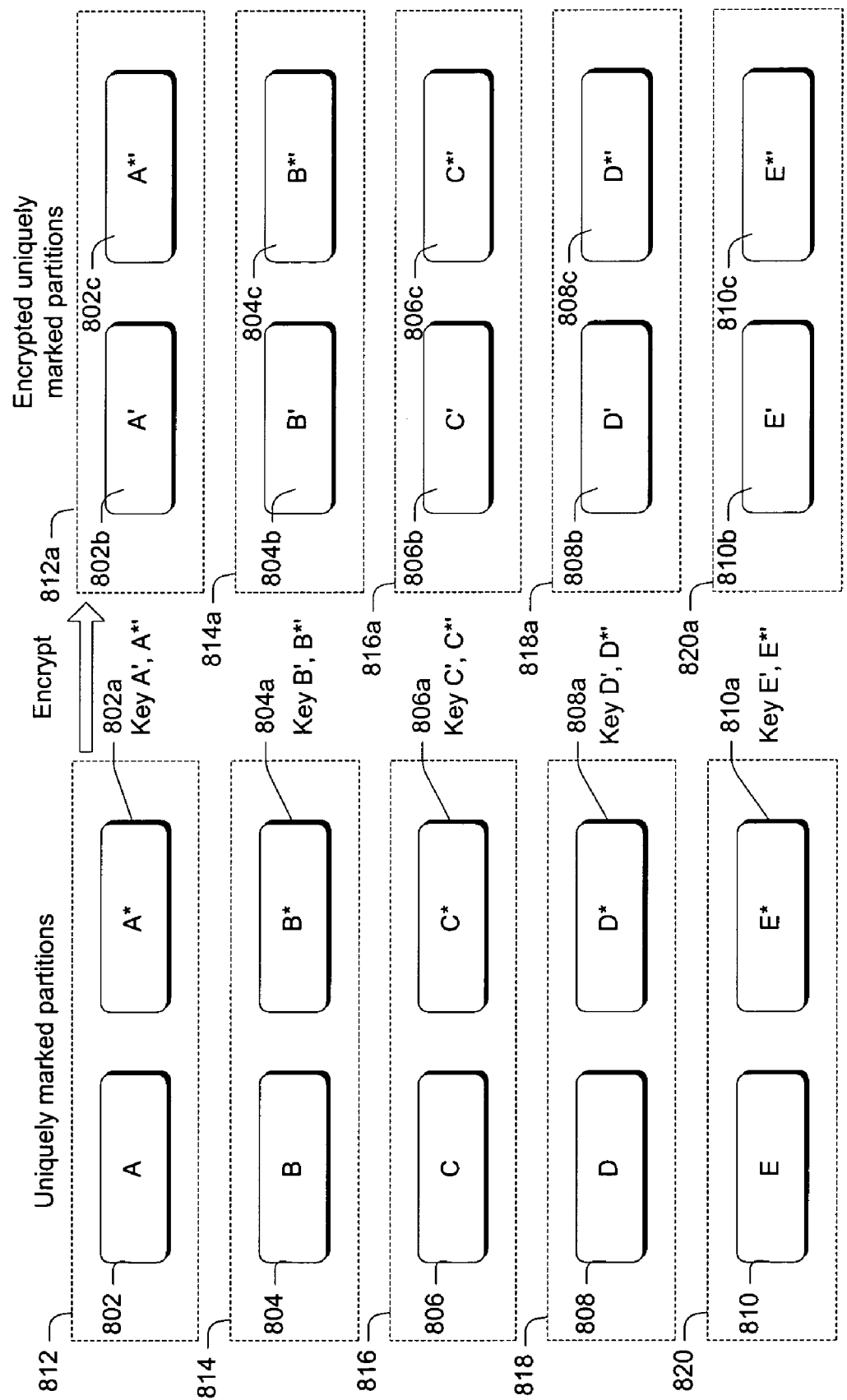
FIG. 9 is a block diagram that diagrammatically depicts exemplary processing steps in accordance with one described embodiment.

FIG. 9 shows, for example, partition sets 812–820 on the leftmost side of the figure and the resultant encrypted partition sets 812a–820a on the rightmost side of the figure. Individual different keys are associated with each of the uniquely marked partitions. For example, partitions 802, 804, 806, 808, and 810 are associated respectively with Keys A', B', C', D', and E'. These keys are utilized to encrypt the partitions to provide respective partitions 802b, 804b, 806b, 808b, and 810b of partition sets 812a–820a. Similarly, partitions 802a, 804a, 806a, 808a, and 810a are associated respectively with Keys A*', B*', C*', D*', and E*'. These keys are different from Keys A', B', C', D', and E' and are used to encrypt partitions 802a, 804a, 806a, 808a, and 810a to provide partitions 802c, 804c, 806c, 808c, and 810c of partition sets 812a–820a.

Accordingly, at this point, all of the partitions have been uniquely marked (as by suitable fingerprinting or watermarking techniques) and encrypted with different keys. Next, individual unique key collections are defined in which, in any one key collection, there appears one and only one key for one partition or clip in each partition set. In the illustrated example, no two key collections are the same.

Thus, if there are N original partitions or clips (before copying and marking takes place), each key collection would comprise N keys.

Each unique key collection is then associated with a corresponding content player and encrypted with that content player's public device key. Recall that by encrypting the key collection with the content player's public device key, only the content player with the corresponding private device key can decrypt the encrypted key collection to access the encrypted content. When the content player accesses the encrypted key collection and decrypts it using their private device key, they now have the corresponding keys to decrypt the encrypted partitions or clips. When the partitions or clips are decrypted, the content player is presented with a uniquely fingerprinted version of the original digital content. For purposes of this document, a key collection for a content player can be considered as a "content key" because it allows a content player to decrypt encrypted content.

It will be appreciated that the encrypted content and the encrypted collection of keys for each content player can be delivered via any suitable medium. For example, the encrypted content might be delivered over a transmission medium such as the Internet, with the individual encrypted key collection for a particular player being delivered in the same manner. Alternately, the encrypted content and an encrypted key collection might be delivered commonly on the same medium. In the in-flight entertainment example, recall that one of the motivations was to provide identical DVDs for each valid content player. This means that not only does the encrypted content have to be identical, but each DVD should contain all of the encrypted key collections for each of the valid content players. Thus, if there are 50,000 valid DVD players, then there should be 50,000 encrypted collections of keys-one for each content player.

Figure 10:
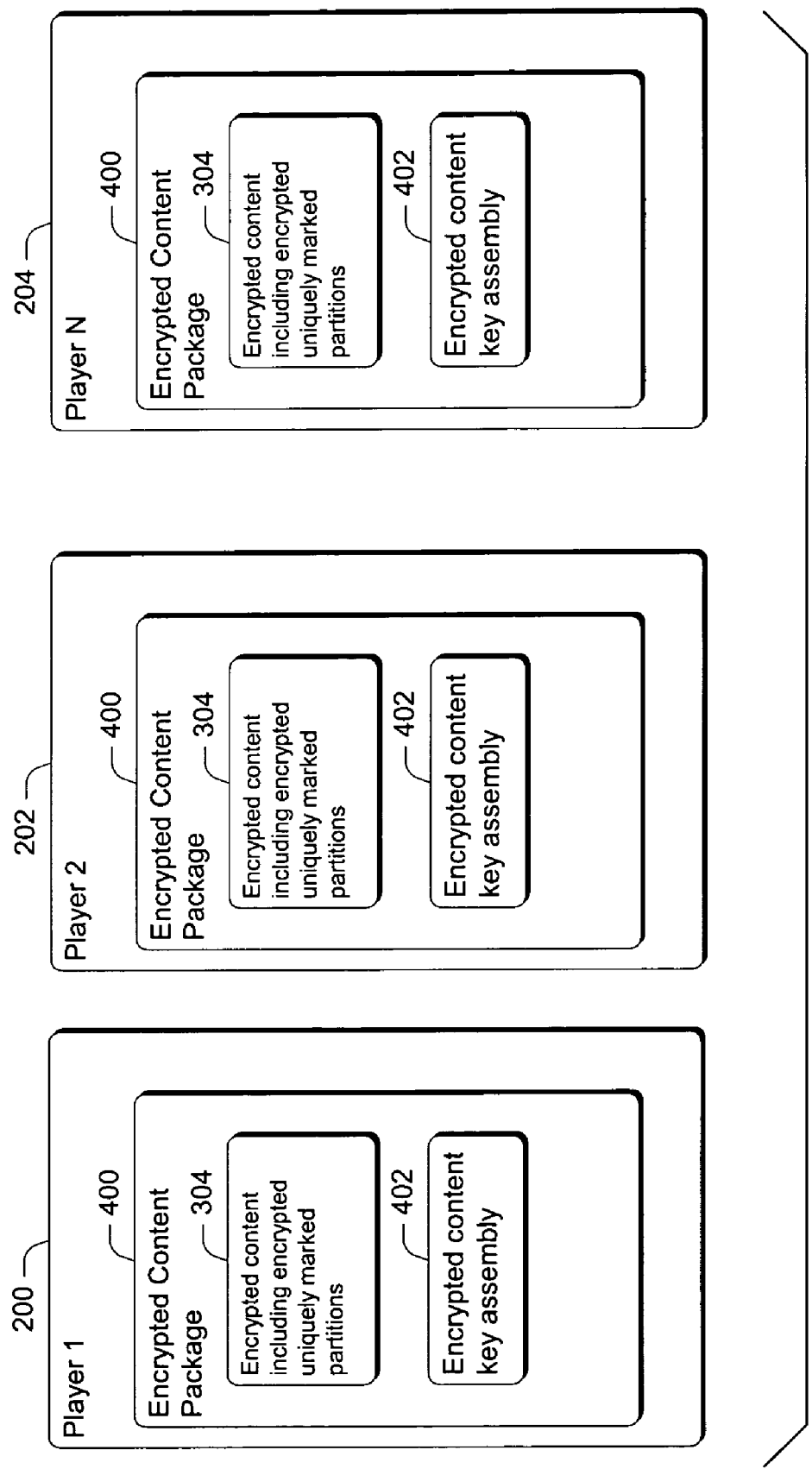
FIG. 10 is a block diagram that shows several exemplary content players in connection with one described embodiment.

FIG. 10 shows content players 200, 202, and 204. Each of the content players has been loaded with an identical DVD containing an encrypted content package 400. Each encrypted content package 400 includes the encrypted content 304 having the encrypted uniquely marked partitions or clips, as well as the encrypted content key assembly 402 containing all of the key collections that have been encrypted with each content player's public device key.

Figure 11:
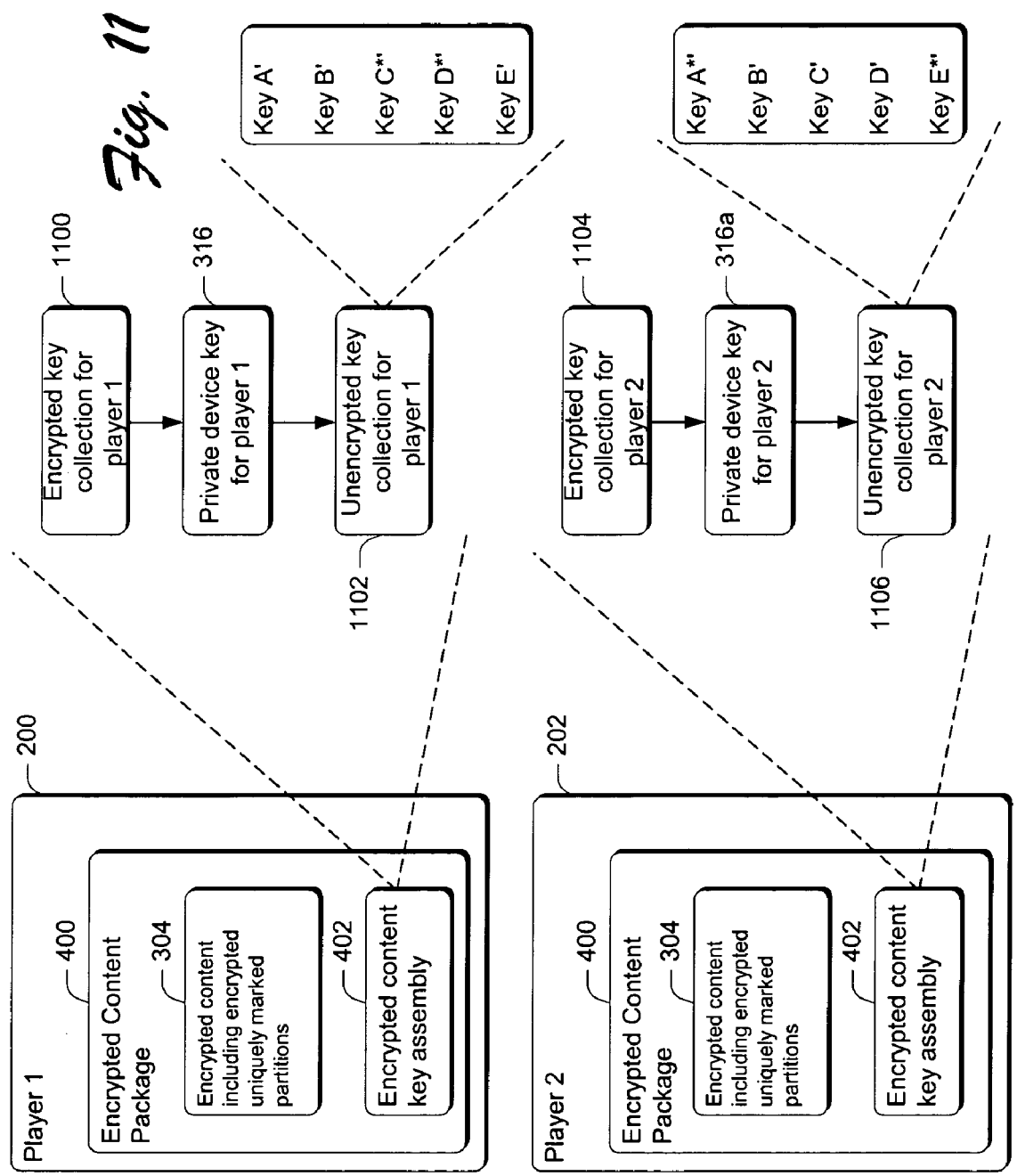
FIG. 11 is a block diagram that shows exemplary content players in connection with one described embodiment.

FIG. 11 diagrammatically illustrates a process by which the individual content players access their individual encrypted key collections and decrypt them to access the keys that have been used to encrypt the individual partitions or clips. Specifically, and with reference to content player 200, the content player is programmed to access the encrypted content key assembly 402 to find its specific encrypted key collection 1100. Once the player locates its encrypted key collection 1100, it decrypts it using its private device key 316 to provide an unencrypted key collection 1102. In this particular example, the unencrypted key collection for player 200 comprises the following keys: A', B', C*', D*', and E'. Similarly, player 202 accesses its specific encrypted key collection 1104 and decrypts it using its private device key 316a to provide the unencrypted key collection 1106. In this particular example, the unencrypted key collection for player 202 comprises the following keys: A*', B', C', D', and E*'. Notice that each player's key collection is different. The same can be said of all of the content players in the universe of content players. Accordingly, no two content players have exactly the same key collection. As such, it logically follows that each content player, by virtue of using its unique key collection to decrypt the content's partitions, is presented with a slightly different version of the original digital content. Recall that each individual partition is individually differently fingerprinted or watermarked. As a result, when the partitions are decrypted by the content players, each individual version of the digital content is different. Because the unique key collections are associated with the individual content players, if an unauthorized copy is made, its fingerprint can be ascertained and hence, from this information, the key collection that was used to decrypt the content can be ascertained. Because each content player was given a unique key collection, the precise content player from which the digital content was obtained can be ascertained.

FIG. 12 is a flow diagram of steps in a method in accordance with the described embodiment. The method can be implemented in any suitable hardware, software, firmware, or combination thereof. In the illustrated example, these steps are likely to implemented by the manufacturer of a DVD or its assignees (such as a processing lab) prior to distribution of its digital content. Step 1200 partitions unencrypted content into multiple partitions. This can be done by in any suitable way. For example, the unencrypted content can comprise the audio stream of a movie, and suitable places to partition the audio stream can be ascertained by looking for where the stream is the least complex. Alternately the video stream can be partitioned. Step 1202 makes multiple copies of the partitions to provide multiple corresponding partition sets. Examples of partition sets are given in FIG. 8. Step 1204 uniquely marks each individual partition of a partition set. This can be accomplished using any suitable known or subsequently developed fingerprint or watermarking technique. Recall also that these steps can be implemented in a more integrated fashion as through the use of multiple cameras to provide multiple camera angles in certain movie scenes. In that case, by virtue of using two different camera angles for the certain movie scenes, the unencrypted content (i.e. the entire movie) can be considered as being partitioned into partitions (step 1200) with multiple copies of the partition being made (step 1202). The multiple copies would, in this case, be provided by the different camera angles. The act of filming the movie scenes from the different camera angles would uniquely mark each individual partition.

Step 1206 associates a unique key with each uniquely marked partition. An example of this is given in FIG. 9. Step 1208 encrypts each partition with its unique key.

Step 1210 defines individual unique key collections containing one key from each corresponding partition set. The individual keys that comprise each key collection are selected so that no two key collections contain all of the same individual keys. Each of the key collections is then associated with a corresponding content player (step 1212). At this point, consider for example, one of the advantages of this system. The presently-described association of unique key collections is different from other systems that have been employed in the past for the following reason. Here, the particular key collection that authorizes a content player to access the encrypted content is inextricably bound to a particular fingerprint in an index of fingerprints. In other words, there is a unique fingerprint for each version of the digital content that a content player is to play. That unique fingerprint is inextricably associated with the authorized key collection for a particular content player. By virtue of decrypting the encrypted content using its unique key collection, a content player inherently exposes a fingerprint that points directly back to that content player.

Step 1214 encrypts each key collection for a content player with its public device key. Step 1216 then provides the encrypted content and the encrypted key collection to each content player. This step can be implemented by first providing the encrypted content and then second providing the encrypted key collection. That is, the provision of the encrypted content and key collection need not take place at the same time. For example, an encrypted key collection might be provided to a content player such as a set-top box. Subsequently, encrypted content can be delivered to the set-top box and decrypted using the individual keys of the key collection. Delivery of the encrypted content and key collection can take place via different delivery media. For example, the encrypted content might be delivered via the Internet, while the encrypted key collection resides on a smart card or the like. In other embodiments, both can be delivered together on the same media. For example, a DVD might carry both an encrypted movie as well as an encrypted key collection for the content player. Additionally, in the in-flight entertainment example given above, we see how it is possible for the encrypted content and multiple differently-encrypted key collections to be delivered together.

FIG. 13 is a flow diagram that describes steps in a method for receiving and playing encrypted content in accordance with the described embodiment. This method can be implemented by suitably programmed content players. As mentioned above, any suitable content players can be utilized in connection with any suitable encrypted content. In a specific example, the content player comprises a DVD player.

Step 1300 receives encrypted content. The encrypted content can be received via any suitable content-carrying medium. One exemplary and non-limiting example of such a medium is a DVD. The encrypted content contains different encrypted partitions that can be organized to provide different versions of the original digital content. Step 1302 receives an encrypted key collection that contains individual keys that can be utilized to decrypt selected partitions of the encrypted content that is received. The encrypted key collection can be received via any suitable medium. Such medium can be the same as or different from the medium that is used to deliver the encrypted content. Additionally, receipt of the encrypted key collection can take place either contemporaneously with, or at a time that is different from when the encrypted content is received. Step 1304 decrypts the associated encrypted key collection to provide an unencrypted key collection. In the example above, this is done by the player using its private device key (with the key collection having been encrypted with the player's public device key). In embodiments where multiple encrypted key collections are provided to a content player, as in the in-flight entertainment example, the player would first ascertain its specific encrypted key collection from the assembly of key collections it received and then decrypt it. Step 1306 then selects a partition that is associated with each key of the decrypted key collection and step 1309 decrypts each selected partition using the associated key. Step 1310 then plays the decrypted partitions.

The invention claimed is:

1. A method of configuring a content player to process encrypted content comprising:

encrypting a content key with multiple different public device keys each of which being associated with a different content player that is to play digital content that has been encrypted; and providing multiple differently-encrypted content keys to the different content players, each content player being configured to decrypt one of the multiple differently-encrypted content keys with a private device key so that the one content key can be used to decrypt encrypted content which, when decrypted using the one content key, can indicate one specific content player that was authorized to decrypt the content.

2. The method of claim 1 further comprising providing the encrypted content to the different content players.

3. The method of claim 1 further comprising providing the encrypted content to the different content players on individual common media that contain the multiple differently-encrypted content keys.

4. The method of claim 1, wherein the digital content comprises a movie that is to be used for in-flight entertainment, and further comprising providing the encrypted content to the different content players on individual common DVDs that contain the multiple differently-encrypted content keys.

5. A method of processing encrypted content for use in an in-flight entertainment system, comprising:
   encrypting digital content with a content key;
   encrypting the content key with multiple different public device keys each of which being associated with a different in-flight content player that is to play digital content that has been encrypted; and
   associating the encrypted digital content with the multiple differently-encrypted content keys such that when encrypted digital content is decrypted with a particular content key, the decrypted digital content can be used to ascertain a particular in-flight content player on which the decrypted digital content was intended for playing.

6. The method of claim 5, wherein said associating comprises providing the encrypted digital content and the multiple differently-encrypted content keys on a common medium.

7. The method of claim 6, wherein the common medium comprises a DVD.

8. The method of claim 5 further comprising prior to encrypting the digital content with the content key, processing the digital content such that when the encrypted digital content is decrypted with any of content keys, the decrypted digital content contains added indicia that can indicate which one of a number of in-flight content players was authorized to decrypt the digital content.

9. A method of accessing encrypted digital content comprising:
   receiving an encrypted private device key;
   receiving encrypted digital content and one or more encrypted content keys that were used to encrypt the digital content;
   locating an encrypted content key that corresponds to a content player in which the digital content is to be played;
   decrypting the located encrypted content key; and
   decrypting the encrypted digital content using the decrypted content key to provide decrypted digital content, the digital content bearing one or more marks that are uniquely associated with the content key that was utilized to decrypt the encrypted digital content.

10. The method of claim 9, wherein said receiving comprises receiving an encrypted content package containing both the encrypted digital content and one or more encrypted content keys.

11. The method of claim 10, wherein the encrypted content package is embodied on a DVD.

12. The method of claim 10, wherein the encrypted content package is embodied on a DVD intended for use in an in-flight entertainment system.

13. The method of claim 9, wherein said receiving of the one or more encrypted content keys comprises receiving a plurality of encrypted content keys each of which being encrypted with a different public key each of which being associated with a different content player.

14. The method of claim 13, wherein the different content players comprise a predetermined number of content players intended for use in in-flight entertainment systems.

15. The method of claim 14, wherein the content players comprise DVD players.

16. An encrypted content package comprising:
   encrypted content; and
   an encrypted content key assembly comprising multiple differently-encrypted content keys, the content keys being individually associated with an individual content player that is among a limited number of content players, each content key being capable of decrypting the encrypted content and, in so doing, the decrypted content providing indicia that can be utilized to identify a specific content key that was used to decrypt the encrypted content.

17. The encrypted content package of claim 16, wherein the multiple differently-encrypted content keys are encrypted with individual public keys of a public/private key pair associated with each of the content players.

18. The encrypted content package of claim 16 embodied on one or more common media for delivery to each of the content players.

19. The encrypted content package of claim 16 embodied on one or more common DVDs for delivery to each of the content players.

20. The encrypted content package of claim 16 embodied on one or more common DVDs for delivery to each of the content players, the content players comprising in-flight content players for use in in-flight entertainment systems.

* * * * *